UNITED STATES PATENT OFFICE.

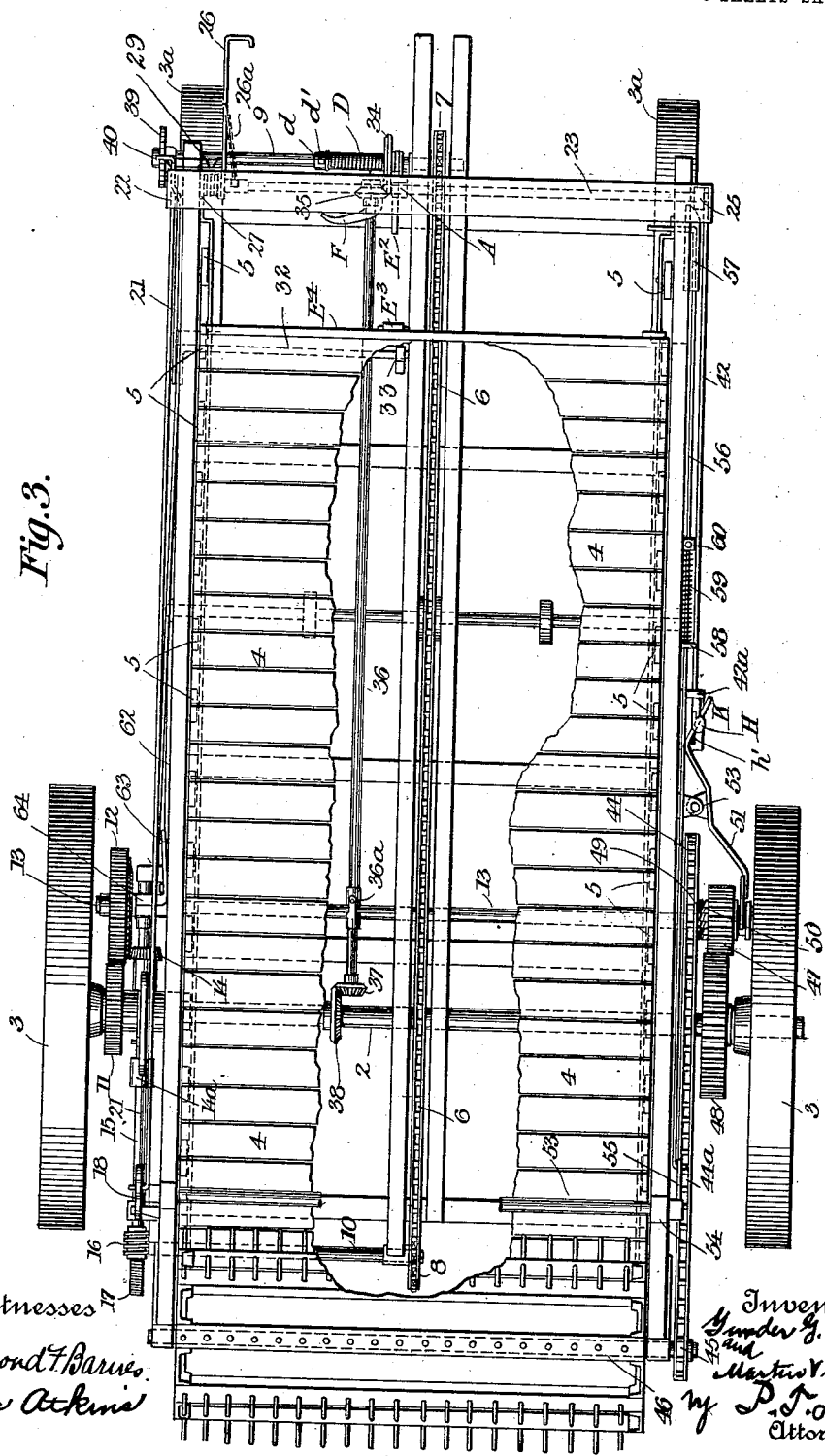

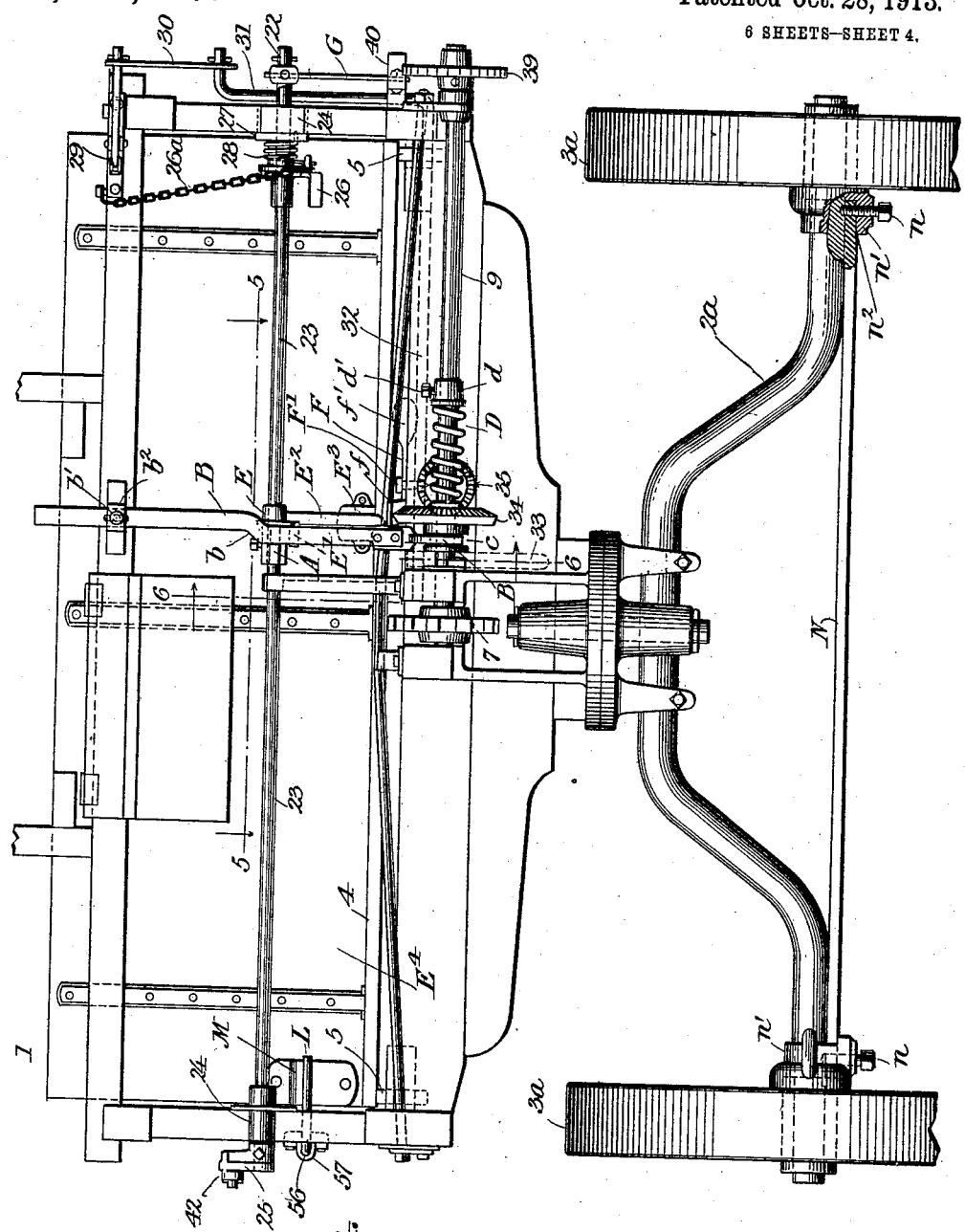

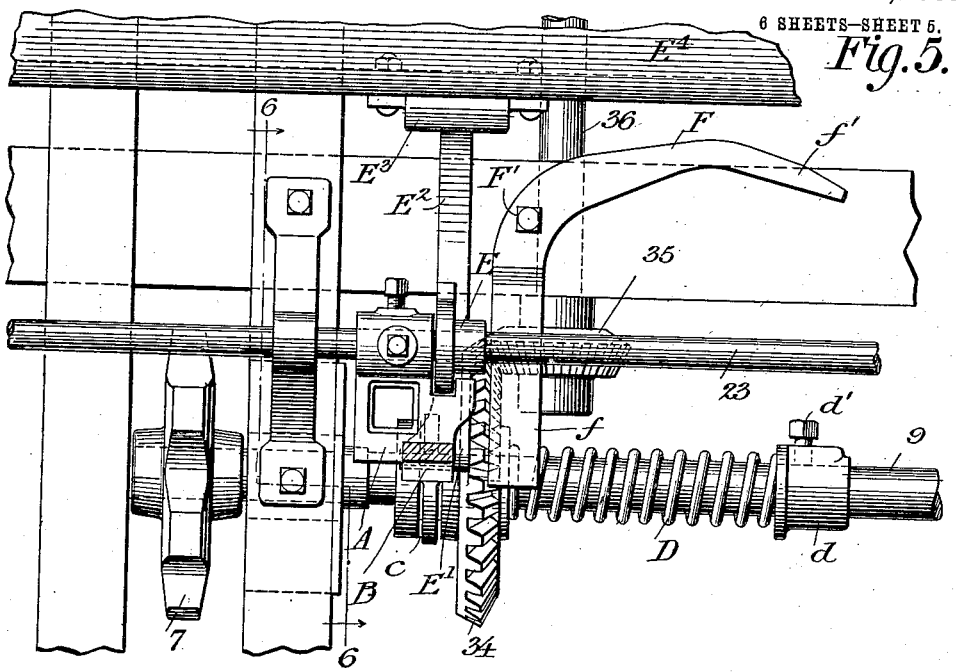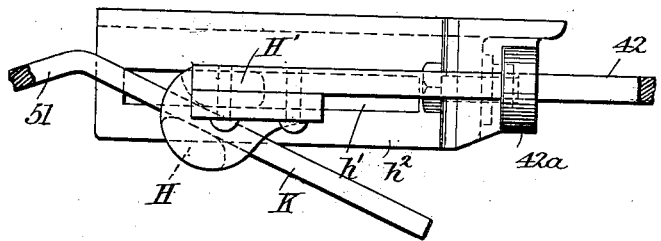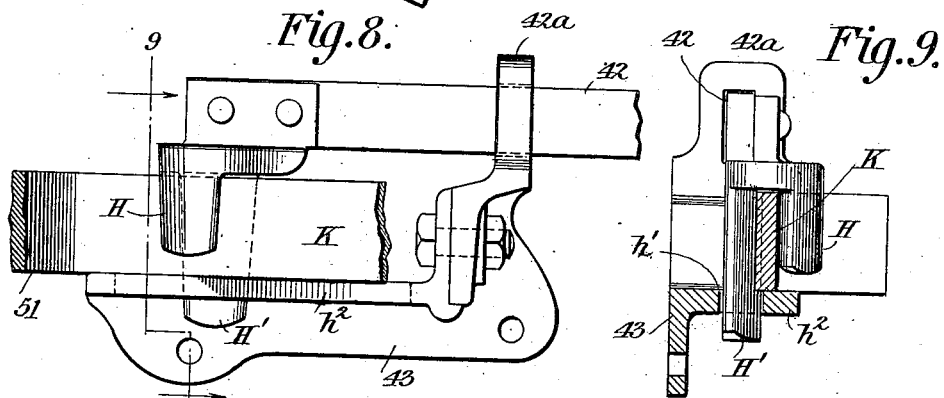

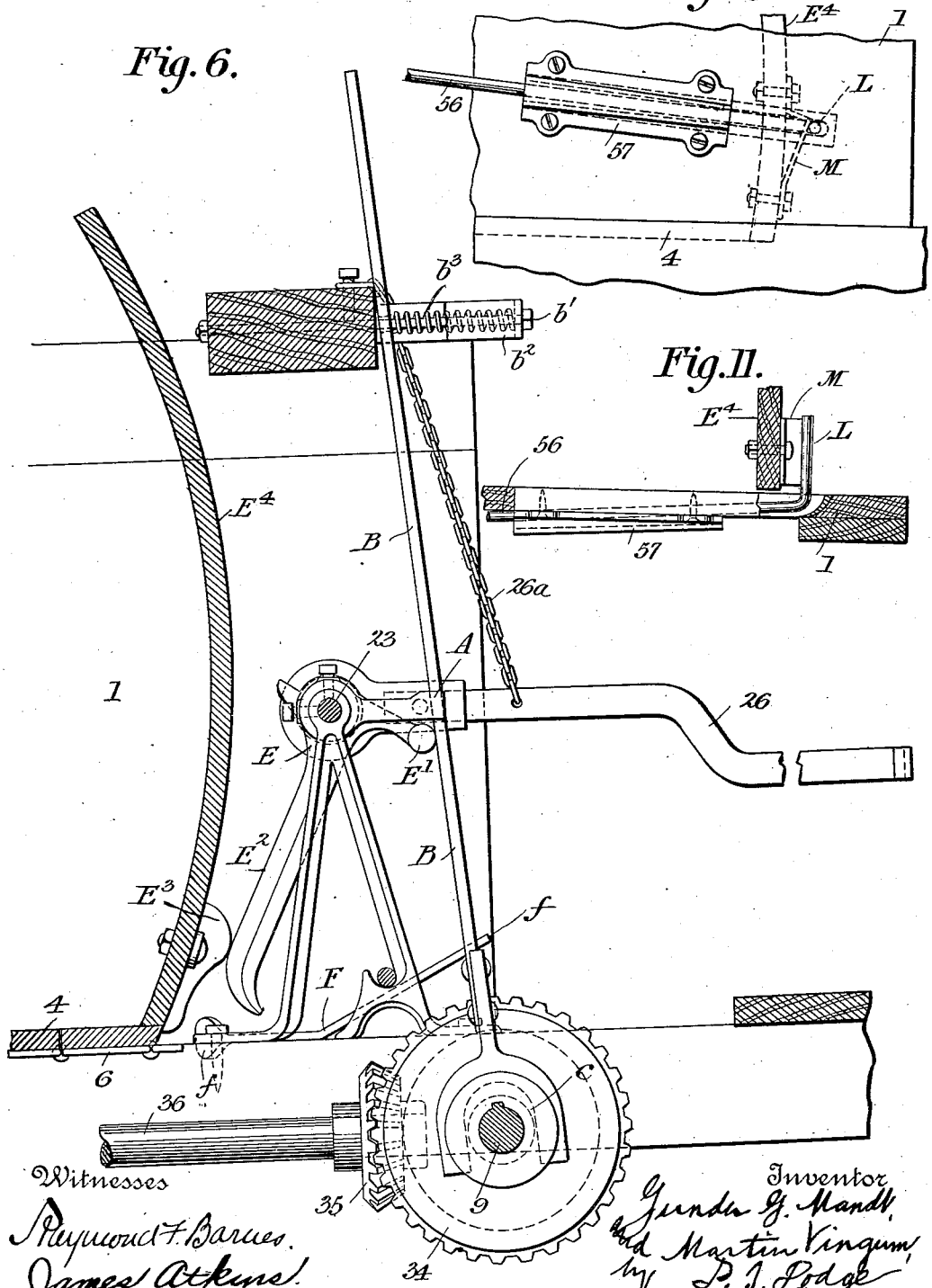

GUNDER G. MANDT, OF MOLINE, ILLINOIS, AND MARTIN VINGUM, OF STOUGHTON, WISCONSIN, ASSIGNORS TO MOLINE PLOW COMPANY, A CORPORATION OF ILLINOIS.

MANURE-SPREADER.

1,077,087.  Specification of Letters Patent.  Patented Oct. 28, 1913.

Application filed December 15, 1909. Serial No. 533,266.

*To all whom it may concern:*

Be it known that we, GUNDER G. MANDT, of Moline, in the county of Rock Island and State of Illinois, and MARTIN VINGUM, of Stoughton, in the county of Dane and State of Wisconsin, have invented a new and useful Improvement in Manure-Spreaders, of which the following is a specification.

This invention relates to improvements in manure spreaders, and more particularly to that class of spreaders in which the load is moved to the rear of the vehicle by a load-carrying apron, and there to be distributed by a discharging or beater mechanism, and in which, also, provision is made for returning the load-carrying apron to loading position at the front of said vehicle after the load has been discharged.

The object of the invention is to produce a spreader which shall include various elements and devices whereby its action is rendered largely automatic and its efficiency and reliability thereby greatly increased.

The invention consists in providing an improved automatic apron-return mechanism whereby the apron is brought back to its normal or initial position after the discharge of the load without necessity of effort on the part of the attendant; also in combining with the automatic apron-return mechanism manually-operated means whereby the return of the apron may be checked or controlled at any desired point; also, in the provision of improved automatic means for actuating the gear mechanism which controls the operation of the return mechanism; and, also, in providing a safety stop-mechanism operating to throw the gear-mechanism of the return-shaft out of gear whenever the automatic mechanism, above referred to, fails to act in a proper manner.

The invention consists also in an automatically-operated rake-regulator and lock, the object of which is to hold the rake in locked position when the vehicle is being loaded and while it is being driven to the field of operation, thereby preventing the load from working back and packing against the beater or spreader-cylinder, and operating automatically to release the locked rake and allow the load to come gradually into contact with said spreader-cylinder.

The invention consists also in a clutch-shifting device which operates automatically to engage and disengage the main driving sprocket.

The invention consists, also, in the construction and operation of a latching-device which holds the apron-locking-ratchet.

The invention consists also in certain novel details, as set forth in the following description and claims.

Figure 1:
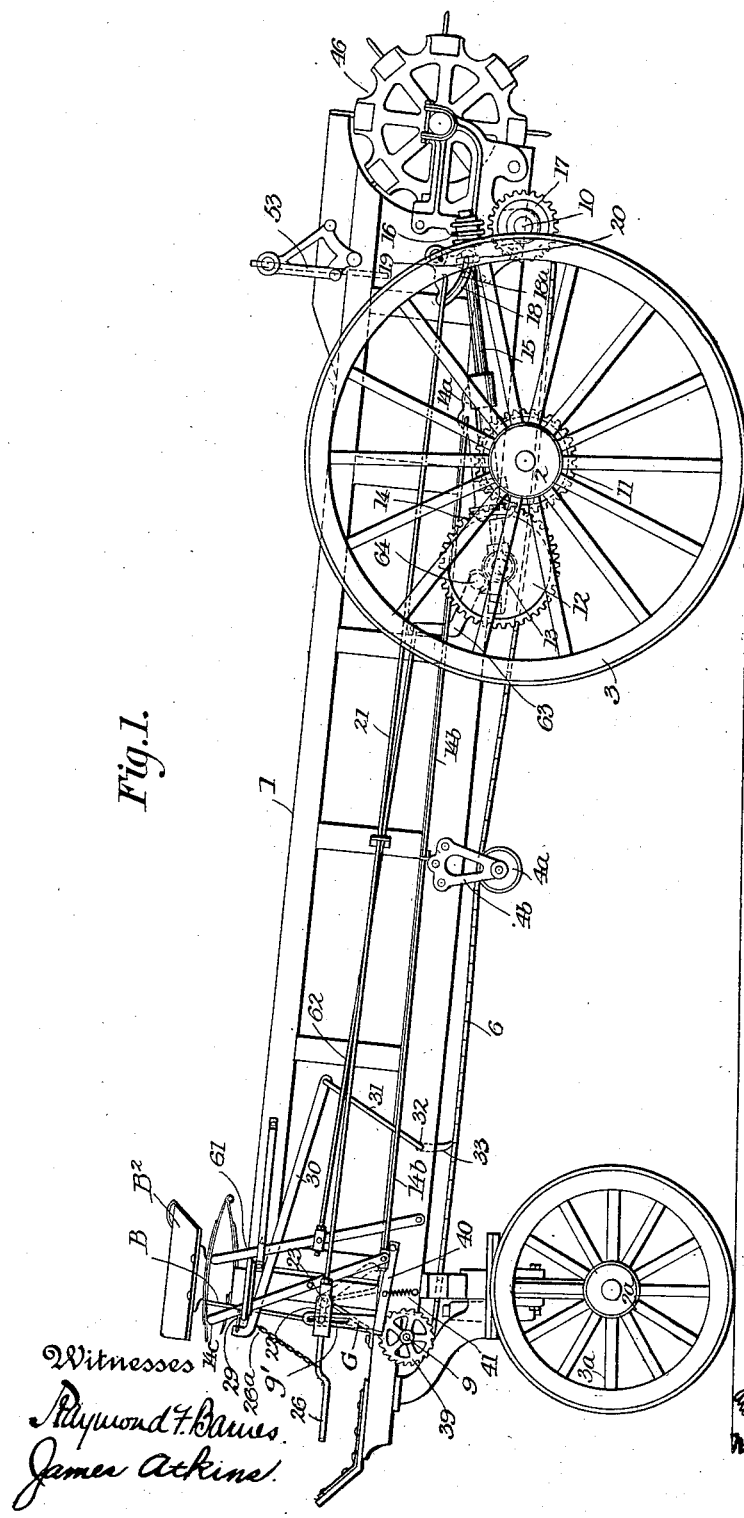
Figure 2:
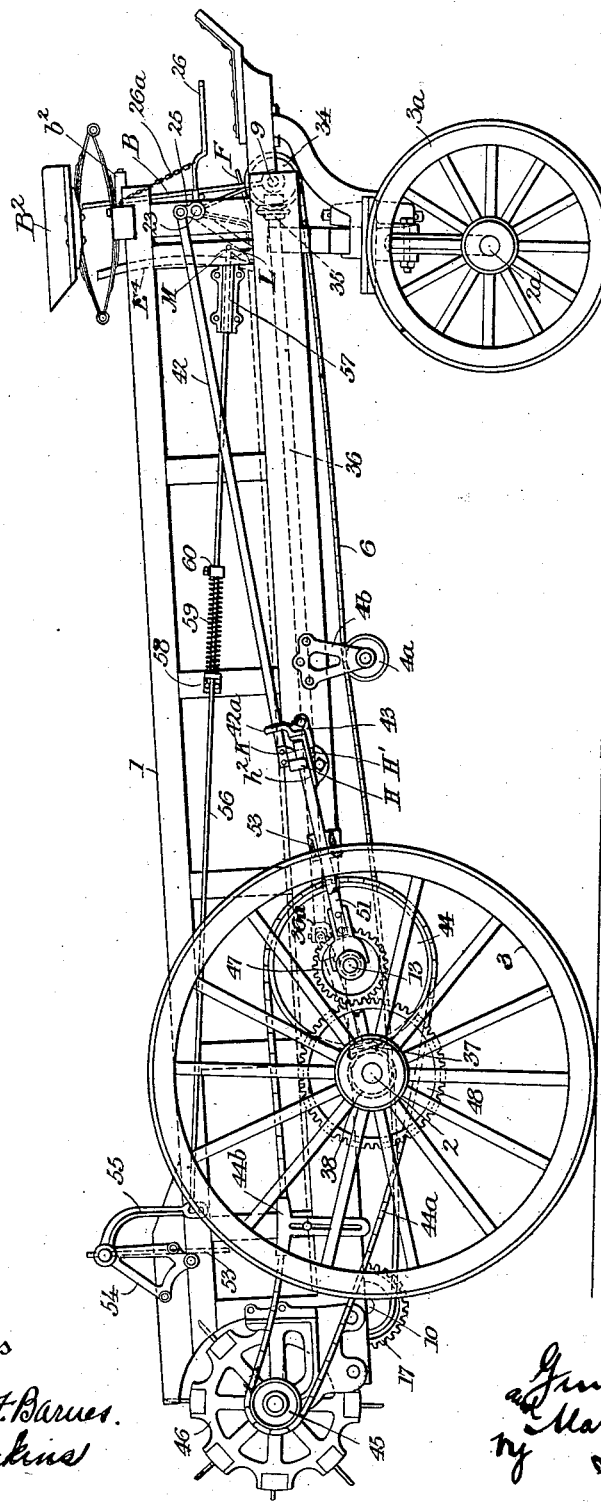

In the accompanying drawings Figure 1 is a side elevation of the left-hand side of a manure spreader constructed in accordance with our invention. Fig. 2 is a similar elevation of the right-hand side of the machine. Fig. 3 is a plan view of the same, with a portion of the apron broken away to show parts beneath. Fig. 4 is a front elevation of the machine on a larger scale. Fig. 5 is a fragmentary plan view on the line 5—5 of Fig. 4. Fig. 6 is a sectional elevation on the line 6—6 of Figs. 4 and 5 looking in the direction of the arrows. Figs. 7, 8 and 9 are details of the clutch-controlling mechanism. Figs. 10 and 11 are details of the rake-controlling mechanism. Fig. 12 is a fragmentary view, in detail of the cam-shaft shifting cam forming a part of the speed-change mechanism.

Referring to the drawings, 1 designates a rectangular vehicle-body, and 2, 2ª rear and front axles supporting the same upon ground-wheels 3, 3ª. The rear axle 2 is mounted in suitable bearings, and in these it is free to rotate. It is driven from the rear ground-wheels 3 by means of ratchet-clutches (not shown) mounted in the hubs of the wheels and arranged to drive the axle on the forward motion of the wheels, and to leave it inactive on the reverse movement.

The bottom of the body 1 is provided with an apron 4 composed of linked slats arranged to move over rollers 5 sustained on the inside of the body 1. The apron is connected at its medial line to an endless sprocket-chain 6 which passes over sprocket-wheels 7 and 8 carried, respectively, by transverse shafts 9 and 10 mounted at the front and rear of the body 1. The apron 4, when being moved to discharge its load, is driven by the rear transverse shaft 10, and by the forward shaft 9 when being returned to its normal or initial position, that is, to loading position.

Power is transmitted to the shaft 10 by a gear 11 (carried by the left-hand rear ground-wheel) meshing with an intermediate gear 12 that is carried by a transverse shaft 13 mounted in brackets on the under side of the body 1. This intermediate gear 12 carries on its inner face a series of gear rings, one or another of which gear rings is adapted to engage with and drive a pinion 14, slidably mounted on a worm-shaft 15. Secured to said pinion 14, is a slidable member 14$^a$, and connected to this is a forwardly-extending shifting-rod 14$^b$, which, at its forward end, is attached to a hand lever 14$^c$. By this means, the pinion 14 may be positioned in mesh with any one of the rings of gearing on the wheel 12, and whereby its speed and that of its adjunctive parts may be changed by the driver. Before the pinion 14 can be shifted into gear with the different gear rings on the pinion 12, as described, the pinion 14 must first be disengaged in a lateral direction from the particular gear ring with which it may be in mesh, and to effect this action, the forward end of the worm shaft is mounted in a housing loosely encircling the shaft 13, so that not only may it be shifted longitudinally on shaft 13 to free pinion 14 from the gear rings, but the worm shaft may also be rocked or pivoted on the shaft 13 as an axis for the purpose presently to be described. This housing is provided at its end with a cam surface adapted to be engaged by a cam member 64 on the lower end of an arm 63, to the upper end of which is jointed the rear end of a rod 62, extending forwardly and jointed to an operating lever 61, mounted on the wagon body within convenient reach of the driver. By pushing the lever to the rear, the cam member 64 will be operated and will shift the end of the worm shaft laterally, thereby disengaging pinion 14 from the gear ring with which it may be in mesh; whereupon by the operation of lever 14$^c$, pinion 14 may be moved radially of gear 12 and brought opposite the particular gear ring with which it is to be engaged; and finally, lever 61 is pulled again to its forward position, with the result that the worm shaft will be shifted laterally back to its former position, and the pinion 14 moved into engagement with the gear ring. The worm-shaft 15 is provided at its rear end with a worm 16 adapted to mesh with a worm wheel 17 secured to the end of the shaft 10. The worm shaft 15 being pivotally mounted on the transverse shaft 13 as described is movable vertically to and from the worm-wheel 17; and its motion is controlled by a swinging cam-plate 18 pivoted to the side of the body 1 and provided with a slot 18$^a$ adapted to engage a pin 19 carried by a collar 20 upon the worm-shaft 15. The swinging cam-plate 18 is controlled in its movement by a connecting-rod 21 extending forward and pivotally secured to a crank-arm 22 disposed upon a transverse rock-shaft 23 which extends across the front of the body 1 and mounted in bearings 24 secured thereto. The opposite end of the rock-shaft 23 is provided with a second crank-arm 25 set at an angle of approximately 90 degrees in relation to the arm 22,—the purpose of which arrangement will be explained in connection with a spreader-cylinder-drive-clutch-mechanism, presently to be described.

Fixedly connected with rock shaft 23 is a manually-operated lever 26, having connected to it one end of a coiled spring 28 which encircles the shaft adjacent the lever and has its opposite end fixed to a collar 24 also encircling the shaft and fixed adjustably in the frame of the machine, the construction and arrangement of the parts being such that when the lever is pulled upwardly from a horizontal position, as shown in Figs. 3 and 4, to a vertical position, as shown in Fig. 1, the shaft will be rocked rearwardly a quarter turn, and at the same time the spring will be placed under tension. When the lever is lifted to its upper position, it engages a catch 29 and is thereby retained in position against the action of the spring. This catch is provided with a releasing-mechanism consisting of an arm 30 (Figs. 1 and 4) connecting with a depending lever 31 carried by a horizontal transverse rock-shaft 32 that is located under the apron 4 and provided with a depending finger 33, which finger is so located as to be engaged by the rear end of the apron (during its travel toward the front of the vehicle beneath the loaded part of the apron as it travels toward the rear to discharge its load) and in such manner as to rock the shaft 32, whereby, and by means of the attached lever 31 and arm 30, the catch 29 is operated to release the control-lever. The downward movement of this control-lever is limited by a chain 26$^a$ connected to it and to a stationary part of the vehicle, as shown in Figs. 4 and 6.

Referring to Figs. 4, 5 and 6, (which illustrate more clearly the automatic means for returning the apron to its initial position), it will be seen that the control-lever 26, when released as above described, is turned (by the action of the coil spring 28) a quarter revolution and carries with it the rock-shaft 23, this action serving to actuate the connecting-rod 21 and thereby disconnect the worm-gear which drives the apron, as previously described, and also to disconnect a driving-clutch which controls a spreader-cylinder 46, as will presently be described. Secured to the rock shaft 23 near its center, is an actuating dog A having in its front end an open recess in which extends a laterally movable shifter member B, pivotally mounted so as to slide back and forth near its upper end on a fore and aft pin $b'$, mounted in a bracket $b^2$ on the body of the machine. The pin is encircled by a spring $b^3$, which bears at its front end against the bracket and at its rear end against the forward side of the member B, and tends to hold said member yieldingly in its rearward position, in which position it will extend in the notch in the dog when the latter is in a forward horizontal position, as shown in Fig. 6. Adjacent the point where the shifter member extends in the notch in the dog, the member is provided with a cam surface $b$, which is so located with reference to the dog that when the dog is thrown down on the rocking of the shaft 23 under the influence of spring 28, the side of the notch in the dog will engage the cam and shift the member B laterally to the right in Fig. 4. The lower end of the shifter B is forked, and engages in an annular groove $c$ in the hub of a bevel gear 34 adapted to slide on (but held from turning by) a spline on the shaft 9 against the pressure of an encircling spiral spring D. This spring is mounted on the shaft 9, and is interposed between the face of the gear 34 and a collar $d$ adjustably held on the shaft 9 by a set-screw $d'$ for adjusting the tension of the spring. When the control-lever 26, rock-shaft 23 and actuating-dog operate under the action of the coil spring 28 and the dog is thrown down forwardly (as already described) the shifter B will be moved to the right, Fig. 4, and will force the gear 34 against the spring D and thereby shifts the gear into mesh with a bevel pinion 35 mounted on the end of a constantly rotating longitudinal two-part shaft 36 connected by universal joint $36^a$ (Fig. 3). This shaft 36 receives motion from the rear rotatable axle 2 through a suitable bevel gear 37 (Fig. 3), disposed on the rear end of the shaft 36, and a gear 38 mounted on said axle. The effect of these gears and of the countershaft 36, acting on the forward transverse shaft 9 through the gears 34 and 35, is to reverse the movement of the sprocket-chain 6 and, thus, of the apron, and return the latter to its initial starting and loading position. It will have been noted, in this connection, that this return movement of the apron is effected automatically.

As the apron reaches its loading position, the gears 34 and 35 are automatically disconnected, and the apron is stopped and temporarily held inactive, by the following mechanism: A bell-crank lever E (Fig. 6) is mounted loosely on the rock-shaft 23 adjacent to the dog A, and is provided with a lifting-finger $E'$ adapted to engage the rear side of the shifter B to force it forward and disengage it from the dog. The longer arm $E^2$ of said bell-crank lever E extends downwardly to occupy a position in the path of movement of a strike-plate or block $E^3$ mounted on the forward head or end-board $E^4$ of the apron 4, and whereby it is engaged as the apron approaches its forward limit of movement. The bell-crank lever is thus actuated, and the shifter B engaged by the finger $E'$ and forced forward sufficiently to disengage the shifter B from the recess in the dog. Thereupon, the spring D will act to disengage gear 34 from gear 35, and, thus, the forward movement of the apron will be arrested. In the event that the spring D should fail to act, (by reason of the accumulation of dirt, etc., on the sliding members just described, or because of their engagement in a too positive manner from any cause), or should not act quickly enough, a safety mechanism is provided in the form of a positively-actuated angular or elbow lever F (Fig. 5) pivotally mounted on a vertical axis as at $F'$ on the forward part of the frame of the machine. One arm $f$ of this lever extends forward alongside the shifter-arm B, and the other arm $f'$ is disposed somewhat beyond the normal forward travel of the end-board $E^4$ of the apron, but adapted to be engaged by said front-board $E^4$ if the apron reaches a point beyond its normal travel. When so engaged, the lever F is moved laterally into engagement with, and operates, the shifter B, and thereby positively disconnects the gears 34 and 35. The sprocket chain comes to rest, and this arrests movement of the apron. As will be noted, the arrangement and location of the parts are such that this lever F will not act except under the condition that the apron is forced forward beyond its usual and normal loading position by the failure of the spring D to act properly. If desired, the driving connection between shaft 36 and gear 35 may be formed by a wooden brake-pin (not shown) and so disposed that in the continued forward movement of the apron in the event of the failure of spring D to disconnect gears 34 and 35, the apron will come up against a fixed part of the frame, such as the brackets in which the shaft 23 is mounted, and being arrested by these brackets, the strain on the gear 35 by shaft 36 will break the pin and permit the shaft to rotate without driving the gear 35. The movement of the apron may also be stopped by the operator at any point in its forward travel by moving the upper end of the shifter B forward so as to disengage it from the dog A,—the bracket $b^2$ and pivot pin $b'$ being elongated (as shown in Fig. 6) to permit this movement, and the spring $b^3$ acting to return the shifter to normal position so as to position it in relation to the dog A. By this means, the movement of the apron may always be checked and controlled.

The apron, after it reaches its loading position is, during loading, retained in the forward position by a ratchet-wheel 39 mounted on the outer end of shaft 9, which wheel is engaged by a pivoted pawl 40 (Fig. 1) held positively in engagement by a spring 41. The pawl has connected with it an upright arm G provided with a vertical slot $g'$, in which the end of the crank 22 extends, these parts being so disposed relatively, that when lever 26 is pulled up to a vertical position to start the operation of the machine, the pawl will be lifted from engagement with the sprocket wheel and will release the apron. By the provision of the vertical slot in the arm G with the crank 22 operating therein as described, this crank is permitted a certain latitude of movement by shaft 23, without operating arm G to release the apron. The purpose of this is to enable the shaft to be operated to throw in the beater mechanism, before the shaft operates to release the apron and to throw in the apron feed, the object being to enable the beater to gain its proper speed before the body of manure is presented to the action of the same. This result is accomplished by so arranging the parts relatively, that in the action of pulling up lever 26 to start the machine, the first part of the movement will connect the clutch which operates the spreader cylinder, as will be presently described; the second part of the action will be to release the apron, and the third and final part of the action will be to throw in the apron feed. This sequence of actions prevents the load from being forced back against the spreader cylinder until the latter has gained sufficient speed to properly distribute the same.

The clutch-mechanism which drives the spreader-cylinder is connected to the crank-arm 25 of the rock-shaft 23 by a connecting-rod 42, which is arranged to slide in a suitable eye $42^a$ carried by a plate 43 that is secured to the side of the body 1. The rear end of the rod 42 carries two depending fingers H, H'. The finger H' is elongated and is guided in a slot $h'$ in an angular bracket $h^2$ projecting from the plate 43.

On the end of the transverse shaft 13, which also projects from the right-hand side of the machine, is mounted a loose sprocket-gear 44 connected by a chain $44^a$ with a drive-sprocket 45, and by which the spreader-cylinder 46 is driven. To take up slack of said chain $44^a$, an adjustable engaging member $44^b$ may be slidably mounted on the side of the vehicle body. A sliding splined pinion 47 is also carried by the shaft 13, and intermeshes with a driving-gear 48 carried by the right-hand rear ground-wheel.

The sprocket-gear 44 carries one member 49 of a clutch, and the sliding-pinion 47 carries a corresponding member 50. Sliding movement of the pinion 47 is controlled by a forked horizontally-shiftable lever 51 pivotally mounted at 53 upon the side of the body 1, and provided at its forward end with an angular extension K (Fig. 3) extending between the fingers H and H', above referred to, and, adapted to rest upon the angular bracket $h^2$. The movement of the member 42 swings the lever 51 on its pivot and positions the clutch members in or out of engagement. This arrangement of the parts efficiently prevents accidental disconnection of the clutch-lever 51, and retains and guides the lever-extension K and the end of the rod 42 in such manner as to render the operation of the parts certain and efficient.

Arranged above and in advance of the spreader cylinder is a pendent spring-actuated swinging rake 53, carried by a horizontal transverse shaft mounted in suitable standards 54 on the frame, the function of which rake is to prevent the passage of unduly large lumps of the material to the spreader cylinder, and prevent the latter from being clogged by the material. In order that when the wagon body is being refilled and when the machine is being transported to the place of distribution, the material will be prevented from settling back and lodging against the spreader cylinder, we propose to provide for locking the rake with its teeth in a vertical position in front of the cylinder, when the apron is in its forward position ready to receive the load. This locking action we prefer to accomplish automatically by the return movement of the apron when it has completed its return, the rake being unlocked, so that it may perform its usual functions, when the apron starts on its feeding movement. To effect this automatic action, the rake is provided at one end with a depending operating arm 55, connected to the rear end of a rod 56, which extends forwardly through suitable guides 58 and 57 on the side of the body, and has its forward end turned inwardly in the form of a finger L, which projects through the side of the body so as to stand in the path of the end bar $E^4$ of the apron in its return movement, a spiral spring 59 encircling the rod 56 between a collar 60 thereon and the guide 58, and tending to hold the rake yieldingly, when the latter is performing its usual function of effecting the gradual feed of the manure to the spreader. The position of the finger L relative to the path of movement of the apron is such that the finger will be engaged by a strike plate M on the end plate $E^4$, just as the empty apron has completed its return movement, the result being that the rod 56 will be drawn forwardly endwise and will swing the rake teeth forwardly, the teeth standing in a vertical position by the time the apron comes to rest, and being held in such position by the engagement of the strike plate with the finger L. In this position of the rake, the pendent teeth will form a fixed gate or barrier which will prevent the material from lodging against the cylinder until, in the starting movement of the apron, the rake is released. When now the apron feeding mechanism is operated, the apron will move to the rear, and carrying the front board with it, will thereby release the rake, the rear portion of the load at the same time engaging the rake teeth and swinging them back with the finger L still in contact with the strike plate. This action will continue until collar 60 is moved far enough back to compress spring 59 between it and guide 58, whereupon the spring becomes active to yieldingly sustain the rake, which now being wholly released by the strike plate, is in a condition to perform its usual and normal functions.

The operation of the machine is as follows: Assuming that the wagon body has received its load of manure with the apron at rest at the forward limit of its travel, the rake locked in a vertical position, and the controlling lever 26 down, with the spreader cylinder mechanism disconnected and the apron feeding mechanism also disconnected, and finally the apron locked by the engagement of pawl 40 with ratchet wheel 39, the operator, as the machine starts its advance over the field, pulls up lever 26 to a vertical position and locks it up by engagement with latch 29. This movement of the lever will rock shaft 23 a quarter turn rearwardly and will place spring 28 under tension, the rocking of the shaft acting, through the medium of cranks 22 and 25 and their connections, to first connect the spreader cylinder clutch; second, to release the apron; and third, to connect the apron feeding mechanism. As a result of these actions the spreader cylinder will begin to revolve, and by the time it has gained sufficient momentum and speed, the apron will begin its feeding movement, thereby releasing the rake and causing the rear portion of the body of material to be presented to the action of the spreader cylinder, subject to the screening and retarding action of the rake. By the time all of the load has been distributed by the cylinder, the front board will be at the rear end of the body, and the rear end of the apron will be near the front, where it will engage the depending finger 33, and rocking the same, will operate latch 29 and release lever 26. On its release, the lever will be instantly thrown forwardly and downwardly by the spring 28 to a horizontal position, which action will rock shaft 23, and through the medium of the cranks 22 and 25 and their connections, will throw the spreader cylinder mechanism and the apron feeding mechanism out of action, and these parts will instantly come to rest. Simultaneously with these actions, and due to the rocking of shaft 23, dog A will coöperate with cam $b$ on the shifter bar B, and will swing the latter to the right (Fig. 4), thereby shifting gear 34, against the action of spring D, into mesh with gear 35, and the apron actuating chain 6 will be driven in the opposite direction and the empty apron will be returned to its former position with the front board at the front of the machine (Fig. 2), the gear 34 being held in mesh with the gear 35 in such returning action, by the engagement of the shifter lever B in the notch in dog A. Just before the apron completes its return movement, the strike plate $E^3$ on the front board, will engage and rock arm $E^2$, which action will, through the medium of lifting finger $E'$, push shifter bar B forward and release the same from the notch in the dog A, whereupon the spring D will shift gear 34 out of mesh with gear 35, and the apron will come to rest in its forward position, in which position it will be held by the engagement of pawl 40 with ratchet wheel 39. At the moment that arm $E^2$ is rocked, strike plate M on the front board will engage with the finger on the rake-operating rod 56, and will draw the rake forwardly and lock the same with its teeth in a vertical position in front of the spreader cylinder. All of the parts are now at rest and the machine ready to receive another load of manure, which, when the foregoing operations are repeated, by the pulling up of lever 26, will be distributed as before.

In order to prevent spreading of the forward arched axle of the machine, it is provided with a truss-rod N extending between the wheels and secured by set-screws $n$, $n$, extending through the sand-collars $n'$, $n'$ which limit the inner position of the wheel-hubs. The ends of the truss-rod are seated in recesses $n^2$, $n^2$ in the sand-collars, and the screws are passed through holes in the ends of the truss-rod adapted to register with similar holes in the axle and in the collars. By this means, a single securing device at each end serves to hold the parts in operative position.

While, we have herein described the details of our construction, we do not limit ourselves to such details except in so far as they are specified in the claims.

Having thus described our invention and the manner of carrying it into effect, what we claim and desire to secure by Letters-Patent is:

1. In a manure-spreader, a traveling load-carrying apron, ground-wheel-driven mechanism for actuating said apron toward discharging position, means for arresting the travel of said apron, apron-returning mechanism for automatically effecting return of the apron to normal position, a single mechanism-controlling device including a transverse rock-shaft, a tensioning element connected therewith and operated thereby when moved in one direction and, in its turn, operating to actuate said rock-shaft in the reverse direction, and independent actuating devices between said shaft and said apron-driving and apron-returning mechanisms.

2. In a manure-spreader, a traveling load-carrying apron, ground-wheel-driven mechanism for actuating said apron toward discharging position, automatically-operated apron-returning mechanism, means for arresting the travel of the apron and operating to actuate said automatically-operated apron-returning mechanism, a single mechanism-controlling device including a transverse rock-shaft, a tensioning element connected therewith and operated thereby when moved in one direction and, in its turn, operating to actuate said rock-shaft in the reverse direction, and independent actuating devices between said shaft and said apron-driving and apron-returning mechanisms.

3. In a manure-spreader, a traveling load-carrying apron, ground-wheel-driven mechanism for actuating said apron toward discharging position, automatically-operated apron-returning mechanism, and automatically and manually-operated means for arresting the travel of the apron and operating to actuate said automatically-operated apron-returning mechanism and including a mechanism-controlling rock-shaft and a shaft-tensioning element connected therewith and adapted to be flexed by said shaft when actuated in one direction and operating in its turn to actuate said shaft in the opposite direction, and independent actuating devices between said shaft and said apron-driving and returning mechanism.

4. In a manure-spreader, a traveling load-carrying apron, ground-wheel-driven mechanism for actuating said apron toward discharging position, automatically-operated apron-returning mechanism, means for initiating the travel of the apron and operating to actuate said automatically-operated apron-returning mechanism, said means including a mechanism-controlling shaft and a shaft-controlling spring connecting therewith and adapted to be flexed by said shaft when rotated in one direction and in its turn to actuate said shaft in the opposite direction, a crank carried at one end of said shaft, a connection between said crank and apron-driving mechanism, and an independent actuating device between said shaft and said apron-returning mechanism, and means for controlling the actuation of said automatically-operated apron-returning mechanism.

5. In a manure-spreader, a traveling load-carrying apron, ground-wheel-driven mechanism for actuating said apron toward discharging position, automatically-operated apron-returning mechanism, means for arresting the travel of the apron and operating to actuate said automatically-operated apron-returning mechanism, means for arresting the return travel of said apron at its starting point, and safety-mechanism disposed beyond the normal return travel of the apron and adapted to be engaged by said apron when advanced beyond its normal starting position.

6. In a manure-spreader, a traveling load-carrying apron, apron-driving mechanism for moving said apron toward discharging position, means for starting said mechanism including a lever-operated shaft, a spring encircling said shaft and adapted to be tensioned when said shaft is rotated in one direction to initiate operation of said starting mechanism and operating to rotate the shaft in the reverse direction, apron-returning mechanism, and arresting mechanism therefor including an apron-engageable actuating-element on said shaft, a shifter operated by said actuating-element, and gearing acting under the control of said shifter.

7. In a manure-spreader, a traveling load-carrying apron, apron-driving mechanism for moving said apron toward discharging position, means for starting said mechanism including a lever-operated shaft, a spring encircling said shaft and adapted to be tensioned when said shaft is rotated in one direction to initiate operation of said starting mechanism and operating to rotate the shaft in the reverse direction, apron-returning mechanism, automatic and manually operable arresting mechanism therefor including an apron-engageable actuating-element on said shaft, a shifter actuated by said actuating-element, and gearing acting under the control of said shifter.

8. In a manure-spreader, a traveling load-carrying apron, apron-driving mechanism for moving said apron toward discharging position, apron-returning mechanism, means for starting said driving-mechanism including a lever-operated rock-shaft, a spring encircling said shaft and adapted to be tensioned when said shaft is rotated in one direction to initiate operation of said starting-mechanism and operating to rotate the shaft in the reverse direction, and a connection between said shaft and the apron-driving mechanism, and reversing-mechanism including a shifter arranged in juxtaposition to said shaft, a dog carried by said shaft and adapted to engage and actuate said shifter, and a bell-crank-lever mounted on said shaft adjacent said dog and adapted to engage said shifter.

9. In a manure-spreader, a traveling load-carrying apron, apron-driving mechanism for moving said apron toward discharging position, apron-returning mechanism, means for starting said driving-mechanism including a lever-operated rock-shaft, a spring encircling said shaft and adapted to be tensioned when said shaft is rotated in one direction to initiate operation of said starting-mechanism and operating to rotate the shaft in the reverse direction, and a connection between said shaft and the apron-driving mechanism, reversing-mechanism including a shifter arranged in juxtaposition to said shaft, a dog carried by the shaft and adapted to engage and actuate said shifter, a bell-crank-lever connected to said shaft adjacent said dog and adapted to engage the shifter to actuate the same and disengage it from the dog, and means carried by the apron and adapted to engage said bell-crank-lever to actuate the same.

10. In a manure-spreader, a traveling load-carrying apron, apron-driving mechanism for moving the apron to discharging position, lever-operated means for controlling said apron-driving mechanism including a rock-shaft and a spring adapted to be tensioned by said shaft when the latter is rotated in one direction and whereby operation of said driving-mechanism is initiated and operating to rotate said shaft in the reverse direction, apron-reversing mechanism including a shifter arranged in juxtaposition to said shaft, a dog carried by said shaft and adapted to engage and actuate said shifter, and gearing adapted to be thrown into operation by said shifter to return the apron to loading position.

11. In a manure-spreader, a traveling load-carrying apron, driving-mechanism for moving said apron toward discharging position, a rotatable spreader-cylinder, means for rotating said spreader, apron-returning mechanism, automatic apron-arresting mechanism, a rotatable mechanism-controlling member common to said apron-driving mechanism and to said spreader cylinder operating means for controlling their action, pawl-and-ratchet mechanism for holding said apron against movement and controlled by said mechanism-controlling member, said latter mechanism operating first to set said spreader-cylinder into operation to attain a predetermined speed, then to release said apron-holding mechanism, and finally to initiate actuation of said apron-driving mechanism, said apron-returning mechanism including a clutch-device, gearing, a shifter-element and a dog carried by said mechanism controlling-member and having a coöperative relation with said shifter-element.

12. In a manure-spreader, a traveling-load-carrying apron, ground-wheel-driven mechanism for driving said apron toward discharging position, a rotatable spreader-cylinder, means for rotating said cylinder, apron-returning mechanism, automatic apron-return arresting-mechanism, means controlled by the movement of the apron toward discharging position for stopping said cylinder, a rake disposed in juxtaposition to said spreader-cylinder, and means operated by the apron for positioning and locking said rake relatively to the cylinder and including a connection-operating element disposed in the path of the apron, and a connection between said element and the rake.

13. In a manure-spreader, a traveling load-carrying apron, ground-wheel driven-mechanism for feeding the apron toward discharging-position, mechanism for returning the apron to loading-position, clutch-mechanism for controlling the apron-returning mechanism, a spring-controlled rock-shaft adapted to be set in one position, and to be released therefrom by the apron at a predetermined point in its travel and operating to arrest the feeding movement of the apron, an automatically-operated clutch-shifting device including a lever operating to initiate release of said clutch-mechanism, a spring acting on said clutch-mechanism, means carried by the apron and adapted to engage and actuate said lever, and a shifter-element adapted to be engaged by the lever.

14. In a manure-spreader, a traveling load-carrying apron, ground-wheel driven-mechanism for feeding the apron toward discharging-position, mechanism for returning the apron to loading-position, clutch-mechanism for controlling the apron-returning mechanism, a spring-controlled rock-shaft adapted to be set in one position, and to be released therefrom by the apron at a predetermined point in its travel and operating to arrest the feeding movement of the apron, an automatically-operated clutch-shifting device including a lever operating to initiate release of said clutch-mechanism, a spring acting on said clutch-mechanism, means carried by the apron and adapted to engage and actuate said lever, a shifter-element adapted to be engaged by the lever, and an auxiliary shifter-means operable by the apron beyond its normal loading-position to effect an arrest of its return movement.

15. In a manure-spreader, a traveling load-carrying apron, wheel-driven mechanism for driving said apron, gearing deriving rotation from said driven-mechanism for returning the apron to loading position, mechanism for automatically engaging and disengaging said gearing from said driven-mechanism, including a shifter, an angular member, means carried by the apron and adapted to engage said angular member to actuate said shifter, a dog adapted to engage said shifter and from which said angular member is adapted to disconnect said shifter, and a rock-shaft upon which said dog is mounted, a spring for rotating said shaft in one direction, and connections between said shaft and said wheel-driven mechanism.

16. In a machine of the kind described, a reciprocating load-carrying apron, mechanism operated from a ground-wheel whereby the apron is driven to discharge the load, a normally disconnected gearing included in said mechanism, mechanism for returning the apron to its initial point, a normally disconnected gearing included in said return mechanism, a control-lever operating against the tension of a spring to connect the gearing of the drive-mechanism, a holding-device for retaining the control-lever when so operated, means operated by the continued movement of said apron to release said holding-device, mechanism operated by the consequent movement of the control-lever under the tension of said spring to connect the gearing whereby the apron is returned to its initial point, a rock-shaft with which said lever and spring are connected, connections between said shaft and the first-mentioned normally-disconnected gearing and whereby the same is actuated, a shifter-member juxtaposed to said shaft and shiftable laterally to control the apron-return mechanism and having a fore-and-aft movement to arrest return-travel of the apron, a shifter-actuating element carried by said shaft, and a clutch-mechanism controlled thereby and connecting with said return-mechanism gearing.

17. In a manure-spreader, a load-carrying apron adapted to travel alternately in opposite directions, ground-wheel-driven mechanism for driving said apron toward discharging position, mechanism connecting with said ground-wheel-driven-mechanism for returning said apron to loading position, and a mechanism-controlling device manually movable in one direction to connect said apron-driving mechanism with the load-carrying apron, and automatically movable in a different direction to disconnect said apron-driving mechanism from the apron and, then, to connect said apron-returning mechanism with said apron, said device being controlled in one of its movements by said traveling apron, and including a rock-shaft, an operating lever connected therewith for rocking said shaft in one direction to actuate said driving mechanism, a spring tensioned by said shaft for rotating it in the opposite direction, an actuating device interposed between said apron-return mechanism and the shaft and comprising a clutch-device and a shifter-element deriving motion in one direction from said shaft, a dog for actuating said shifter-element, and apron-controlled means for disengaging the shifter from said dog.

18. In a manure-spreader, a load-carrying apron adapted to travel alternately in opposite directions, ground-wheel driven-mechanism for driving said apron toward discharging position, mechanism connecting with said driven-mechanism for effecting return of said apron to loading position, mechanisms for arresting travel of said apron at the discharge and loading positions, respectively, and a mechanism-controlling device common to said drive, return, and arresting-mechanisms and operable in one direction to connect said apron-drive mechanism with the apron, and automatically operable in a different direction to effect actuation of said apron-arresting and returning-mechanisms, respectively, and including a rock-shaft, a manually-operable lever and a connecting hub on said shaft for rocking it in one direction to actuate said driving-mechanism, a spring tensioned by said lever for rotating the shaft in the opposite direction, a catch in the path of movement of said lever and co-acting therewith to hold it and the shaft against movement under the influence of said spring, an actuating-device interposed between said apron-return mechanism and the shaft and comprising a clutch-device and a shifter-element deriving motion in one direction from said shaft.

19. In a manure-spreader, a load-carrying apron adapted to travel alternately in opposite directions, ground-wheel driven-mechanism for driving said apron toward discharging position, mechanism connecting with said driven-mechanism for effecting return of said apron to loading position, mechanisms for arresting travel of said apron at the discharge and loading positions, respectively, and a mechanism-controlling device common to said drive, return, and arresting-mechanisms and operable in one direction to connect said apron-drive-mechanism with the apron and automatically operable in a different direction to effect actuation of said apron-arresting and returning-mechanisms, respectively, and including a rock-shaft, a manually-operable lever and a connecting hub on said shaft for rocking it in one direction to actuate said driving-mechanism, a spring tensioned by said lever for rotating the shaft in the opposite direction, a catch in the path of movement of said lever and co-acting therewith to hold it and the shaft against movement under the influence of said spring, and an actuating-device interposed between said apron-return mechanism and the shaft and comprising a clutch-device and a shifter-element deriving motion in one direction from said shaft, and speed-changing mechanism operable independently of said controlling-device and connecting with said apron-drive mechanism, and including an actuating rod, a manually-operated lever for controlling the same, ring-gearing connecting with the apron-drive, and a shiftable element operated by said actuating rod in relation to said ring-gearing.

20. In a manure-spreader, a load-carrying apron adapted to travel alternately in opposite directions, ground-wheel driven-mechanism for driving said apron toward discharging position, mechanism connecting with said driven-mechanism for effecting return of said apron to loading position, mechanisms for arresting travel of said apron at the discharge and loading positions, respectively, a mechanism-controlling device common to said drive, return, and arresting-mechanisms and operable in one direction to connect said apron-drive mechanism with the apron, and automatically operable in a different direction to effect actuation of said apron-arresting and returning-mechanisms, respectively, and a safety apron-arresting mechanism operable when the apron passes its normal loading position, and including a shifter-element disposed out of the path of the normal travel of the apron but adapted to be engaged thereby when its travel carries it beyond its normal stopping position, and gears operated by said shifter-element.

21. In a manure-spreader, a traveling load-carrying apron, mechanism for driving said apron alternately in opposite directions, a beater-cylinder located at the discharge position of the apron, drive-mechanism therefor, a rock-shaft, extending transversely of the apron, connections between said rock-shaft and said apron and cylinder-drives and whereby movement of said apron and cylinder is effected and arrested, and including a second shaft arranged in parallelism with said rock-shaft, a gear mounted thereon, a clutch-device for controlling said second shaft, and actuating-instrumentalities interposed between said shafts and including a shifter-element connecting with said clutch-device and deriving movement in one direction from said first-mentioned shaft, a lever connecting with said rock-shaft and adapted to rock the same in one direction to actuate the apron and cylinder-drive-connections, a spring also connecting with said shaft and adapted to rock the shaft in the opposite direction and thereby actuate the connections which arrest said apron and cylinder-drives, and an operating finger disposed in the path of the travel of the apron and adapted to be actuated thereby to release the rock-shaft and permit its movement by the spring.

22. In a manure-spreader, a traveling load-carrying apron, ground-wheel-driven mechanism for driving said apron, gearing deriving rotation from said driven-mechanism, mechanism for engaging and disengaging said gearing from said driven-mechanism and including worm-gearing, an actuating element connecting with said worm-gearing and adapted to separate the members thereof, a transverse rock-shaft with which said actuating-element connects, a crank between said actuating-element and said shaft, a manually-operated lever adapted to rock said shaft in one direction to operate said actuating-element and engage the members of said worm-gearing, a spring encircling said shaft and adapted to be tensioned thereby when rotated in one direction and adapted to rotate said shaft in the opposite direction, a second shaft arranged in juxtaposition to said rock-shaft, a gear splined on said second shaft, a geared shaft connecting with the wheel-driven mechanism, a shifter arranged adjacent to said splined gear, an actuating dog adapted to engage said shifter, and means controlled by the apron for operating said shifter.

23. In a manure-spreader, a traveling load-carrying apron, ground-wheel-driven mechanism for driving said apron, gearing deriving rotation from said driven-mechanism, mechanism for engaging and disengaging said gearing from said driven-mechanism and including worm-gearing, an actuating-element connecting with said worm-gearing and adapted to separate the members thereof, a transverse rock-shaft with which said actuating-element connects, a crank between said actuating-element and said shaft, a manually-operated lever adapted to rock said shaft in one direction to operate said actuating-element and engage the members of said worm-gearing, a spring encircling said shaft and adapted to be tensioned thereby when rotated in one direction and adapted to rotate said shaft in the opposite direction, and independent lever-operated means connecting with said wheel-driven gearing and adapted to change the speed of travel of the apron, a second shaft juxtaposed to the rock-shaft, a gear splined thereon, a shifter arranged adjacent to said gear, an actuating dog adapted to engage and move said shifter, and an apron-operated bell-crank-lever mounted on said rock-shaft and adapted to disengage said shifter from the dog.

24. In a manure-spreader, a traveling load-carrying apron, ground-wheel-driven mechanism for driving said apron, gearing deriving rotation from said driven-mechanism, mechanism for engaging and disengaging said gearing, including worm-gearing, an actuating-element connecting with said worm-gearing and adapted to separate the members thereof, a transverse rock-shaft with which said actuating-element connects, a crank between said actuating-element and said shaft, a manually-operated lever adapted to rock said shaft in one direction to operate said actuating-element and engage the members of said worm-gearing, a spring encircling said shaft and adapted to be tensioned thereby when rotated in one direction and adapted to rotate said shaft in the opposite direction, a beater-cylinder, sprocket driving-mechanism connecting therewith, a clutch-device adapted to connect with said beater-drive gearing, a clutch-shifting mechanism including an angular arm pivoted intermediate of its ends, an actuating-element operatively connecting with said angular arm and cranked to said rock-shaft and adapted to receive movement therefrom, apron-reversing and returning-mechanism comprising a fore-and-aft shaft operatively connecting with said wheel-driven mechanism, a transverse shaft arranged at the end of said shaft opposite to its connection with said wheel-driven mechanism, a clutch-device, a shifter-element connecting with said clutch-device and deriving movement from said apron, and a safety-mechanism connecting with said clutch-mechanism and located beyond the normal return-travel of said apron and adapted to be engaged thereby when said apron is carried beyond its normal stopping position, said mechanism comprising a shifter-element connecting with said clutch-mechanism.

25. In a manure-spreader, a traveling load-carrying apron, ground-wheel-driven mechanism for driving said apron gearing deriving rotation from said driven-mechanism, mechanism for engaging and disengaging said gearing from said driven-mechanism, a beater-cylinder arranged in juxtaposition to the discharging position of the apron, a cylinder-drive gearing connecting with said wheel-driven mechanism, a transverse rock-shaft, independent connections cranked on said rock-shaft and connecting with said gear-engaging and disengaging mechanism and said cylinder-drive mechanism whereby, when said shaft is rocked in one direction, said beater-cylinder is initially operated and, in sequence, said apron-drive mechanism is actuated, a spring encircling said shaft and adapted to be tensioned thereby and operating, when tensioned, to rotate said cranked connections to arrest movement of said apron and beater-cylinder, means for holding said rock-shaft in its actuated position against action by said spring, means actuated by said apron to release said shaft-holding means to permit rotation of said shaft under the influence of said spring, apron-reversing and returning-mechanism controlled by the travel of said apron and including a second transverse shaft juxtaposed to the rock-shaft, gearing and clutch-devices on said second shaft, a bell-crank-lever mounted on the rock-shaft and in the path of travel of the apron, and provided with a lifting-arm, and a shifter arranged adjacent to said bell-crank-lever and operated thereby, and safety-mechanism located out of the normal travel of said apron and adapted to be engaged by the same when said apron is advanced beyond its normal stopping position.

26. In a manure-spreader, a traveling load-carrying apron, apron-driving mechanism for effecting movement of the apron alternately in opposite directions, mechanism for controlling the movement of said apron and including a rock-shaft, a lever for operating the same in one direction, a spring tensioned when said shaft is rotated in one direction by said lever and adapted to actuate the shaft in the opposite direction, a dog-element carried by said shaft, a shifter-member arranged in juxtaposition to and operated by said dog-member, and clutch-mechanism controlled by said shifter-member, said shifter-member being also operable manually to control the travel of the apron at the will of the operator.

27. In a manure-spreader, a traveling load-carrying apron, apron-driving mechanism for effecting movement of the apron alternately in opposite directions, mechanism for controlling the movement of said apron and including a rock-shaft, a lever for operating the same in one direction, a spring tensioned when said shaft is rotated in one direction by said lever and adapted to actuate the shaft in the opposite direction, a dog-element carried by said shaft, a shifter-member arranged in juxtaposition to and operated by said dog-member, and clutch-mechanism controlled by said shifter-member, said shifter-member being moved laterally by said dog-element and movable in a fore-and-aft direction to control the travel of the apron.

28. In a manure-spreader, a traveling load-carrying apron, apron-driving mechanism for effecting movement of the apron alternately in opposite directions, mechanism for controlling the movement of said apron and including a rock-shaft, a lever for operating the same in one direction, a spring tensioned when said shaft is rotated in one direction by said lever and adapted to actuate the shaft in the opposite direction, a dog-element carried by said shaft, a shifter-member arranged in juxtaposition to and operated by said dog-member, and clutch-mechanism controlled by said shifter-member, said shifter-member being moved laterally by said dog-element and in a fore-and-aft direction to control the travel of the apron, said fore-and-aft movement of the shifter-member being effected manually and also by the apron.

29. In a manure-spreader, a traveling load-carrying apron, an apron-driving mechanism, spreader-operating mechanism, an apron-releasing mechanism, and a single means for setting said spreader-operating, apron-releasing and apron-driving mechanisms into operation in a predetermined sequence whereby said spreader-mechanism will attain proper speed before said apron is released and then driven, said controlling means including a lever-operated shaft, a pawl-and-ratchet device controlled thereby, and connections between said shaft and said spreader-operating and apron-driving mechanisms, apron-return feed-mechanism, and means for bringing the same into operation including a spring adapted to be tensioned when said lever-operated shaft is rotated in one direction and operating to actuate said shaft in the opposite direction, a dog-element carried by said shaft, a shifter-member arranged in juxtaposition to and operated by said dog-element, and clutch-mechanism controlled by said shifter-member.

30. In a manure-spreader, a traveling load-carrying apron, ground-wheel-driven mechanism for driving said apron toward discharging position, spreader-operating mechanism deriving movement from said wheel-driven mechanism, apron-holding mechanism, and a single means for controlling said spreader-operating mechanism whereby operation of said mechanisms is initiated in sequence and, thus, the load is prevented from being forced back and into position to be operated upon by said spreader-mechanism until the latter has attained proper speed; said controlling means including a shaft, a crank actuated thereby, a pawl-and-ratchet mechanism, and connections between said shaft and the spreader-mechanism and apron-driving mechanism, apron-return feed-mechanism, and means for bringing the same into operation including a spring adapted to be tensioned when said lever-operated shaft is rotated in one direction and operating to actuate said shaft in the opposite direction, a dog-element carried by said shaft, a shifter-member arranged in juxtaposition to and operated by said dog-element, and clutch-mechanism controlled by said shifter-member.

In testimony whereof, we have hereunto set our hands this 30th day of November, 1909.

GUNDER G. MANDT.
MARTIN VINGUM.

Witnesses for Mandt:
   L. C. BLANDING,
   C. A. BAUMSTER.
Witnesses for Vingum:
   G. H. CARVER,
   HAZEL M. CAMPBELL.

---

Copies of this patent may be obtained for five cents each, by addressing the "Commissioner of Patents, Washington, D. C."